United States Patent
Mukai et al.

[11] Patent Number: 5,744,892
[45] Date of Patent: Apr. 28, 1998

[54] BRUSH AND SLIP RING ARRANGEMENT OF AN AC GENERATOR

[75] Inventors: Takuzou Mukai, Handa; Kenzo Mitani, Obu, both of Japan

[73] Assignee: Nippondenso Co., Ltd., Kariya, Japan

[21] Appl. No.: 699,782

[22] Filed: Aug. 20, 1996

[30] Foreign Application Priority Data

Sep. 6, 1995 [JP] Japan .................. 7-228936

[51] Int. Cl.⁶ .......... H01R 39/24; H01R 39/18; H01R 39/36; H01R 39/08
[52] U.S. Cl. .......... 310/251; 310/248; 310/249; 310/232
[58] Field of Search ............... 310/232, 245, 310/246, 248, 251, 242, 239

[56] References Cited

U.S. PATENT DOCUMENTS

| | | | |
|---|---|---|---|
| 3,184,625 | 5/1965 | Farison | 310/59 |
| 3,185,951 | 5/1965 | Le Beau | 310/232 |
| 4,349,384 | 9/1982 | Weinhart | 75/208 R |
| 4,406,961 | 9/1983 | Pfluger et al. | 310/232 |
| 4,447,752 | 5/1984 | Boyce et al. | 310/248 |
| 4,494,106 | 1/1985 | Smith et al. | 340/58 |
| 4,574,215 | 3/1986 | Mabuchi | 310/248 |
| 4,733,143 | 3/1988 | Chitayat | 318/135 |

FOREIGN PATENT DOCUMENTS

| | | |
|---|---|---|
| 45-2975 | 2/1970 | Japan . |
| 60-204243 | 10/1985 | Japan . |
| 1-298666 | 12/1989 | Japan . |
| 2-269436 | 11/1990 | Japan . |
| 5-6788 | 1/1993 | Japan . |
| 5-49217 | 2/1993 | Japan . |

*Primary Examiner*—Clayton E. Laballe
*Attorney, Agent, or Firm*—Cushman Darby & Cushman IP Group of Pillsbury Madison & Sutro LLP

[57] ABSTRACT

A slip ring unit which comprises self-lubricated carbonaceous rings and a wear resistive brush made of laminated-elastic-copper-alloy-sheets are used to supply a field current to a field coil which is carried by a rotor of an alternator. Therefore, the space for accommodating the brush and slip ring unit of the alternator is made compact and the alternator size can be made small.

9 Claims, 6 Drawing Sheets

BRUSH AND SLIP RING ARRANGEMENT OF AN AC GENERATOR

CROSS REFERENCE TO RELATED APPLICATION

The present application is based on and claims priority from Japanese Patent Application No. Hei 7-228936, filed on Sep. 6, 1995, the contents of which are incorporated herein by reference.

BACKGROUND OF THE INVENTION

1. Field of the Invention

The present invention relates to a generator having a rotor core with rotor coils wound thereon, a pair of slip rings and a pair of brushes.

2. Description of the Related Art

Figure 6:
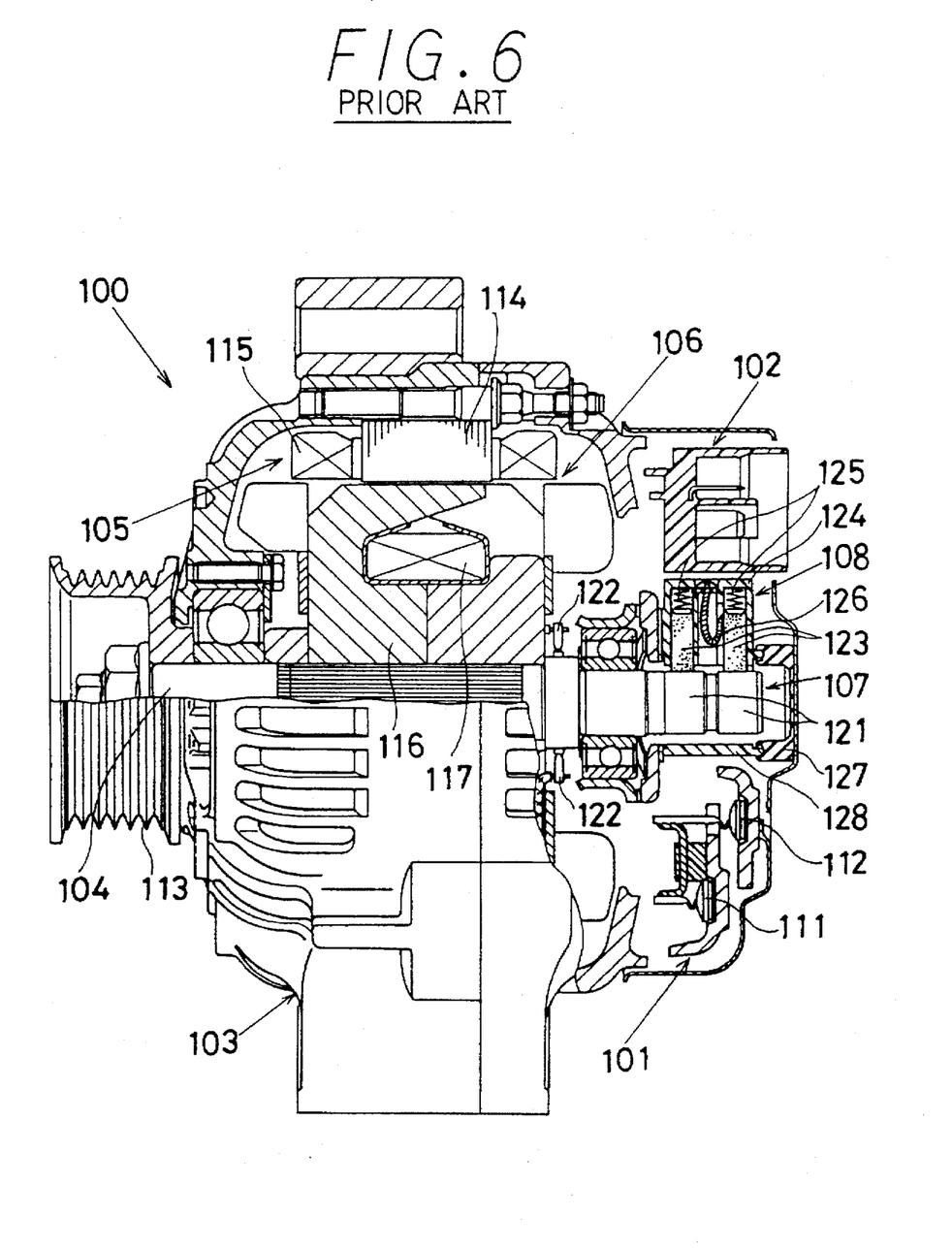
FIG. 6 is a cross-sectional view illustrating a conventional alternator for a vehicle.

As shown in FIG. 6, a conventional alternator 100 for a vehicle has a rectifier 101, a voltage regulator 102 for regulating the output voltage, a housing 103, a shaft 104 rotatably supported thereby, a stator 105 fixed to the inside of the housing 103, a rotor 106 which rotates relative to the stator 105, a slip ring unit 107 secured to an end periphery of the shaft 104 and a brush unit 108 sliding on the outer periphery of the slip ring unit 107.

The rectifier 101 is composed of three positive and three negative diodes 111 and 112. The shaft 104 carries a poly-V belt-pulley 113 at an end thereof. The stator 105 is composed of a stator core 114 and three-phase stator coils 115, etc. The rotor 106 is composed of a Lundell type pole core 116 and a rotor coil 117, etc.

The slip ring unit 107 is composed of two metal rings 121 and two connection bars 122. The metal rings 121 are made of a copper alloy or stainless steel and are press-fitted or directly molded to the outer periphery of the shaft 104 to rotate together with the shaft 104.

The brush unit 108 is composed of two carbon brushes 123, a brush holder 124 which holds the carbon brushes 123 and coil springs 125 which press the carbon brushes against the outer periphery of the metal rings. The carbon brushes 123 are connected to outer terminals (not shown) by copper pig tails 126. The brush holder 124, a rubber packing 127 and a ring cover 128 for the metal rings 121 are insert-molded integrally with an insulating resinous material.

Recently, as the vehicle-engine-compartment has become smaller, the spaces for installing various devices has become smaller. In addition, the restriction of the fuel consumption has become severe and the insurance time of the vehicle is extended. Consequently, smaller and lighter alternator of a long life time is demanded. As a means of making the alternator smaller and lighter, it is necessary to reduce the diameter and axial size of the alternator.

In the conventional alternator 100, the voltage drop of a field control circuit which supplies the field current to the rotor coil 117 is made small to provide a sufficient output power. For this purpose, the brush holder 124 is preferably disposed near the voltage regulator 102. In order for the carbon brushes 123 have sufficient length for the life time in the radial direction, the axial size of the brush holder 124 and the metal rings 121 occupy a large part of the total length of the vehicular alternator 100, resulting in an obstacle of reducing size of the vehicular alternator 100.

The carbon brushes 123 require a suitable area (size) and biasing force (spring load) of the coil springs 125 in order to reduce the electric resistance of the portions in contact with the outer peripheries of the metal rings 121. Therefore, if the contacting area of the brushes 123 is reduced in order to reduce the size of the alternator 100, the current density increases and the temperature of the brushes 123 increases, resulting in shortening the life time thereof.

In a small DC rotary electric machine (e.g. motor), metal brushes (made from laminated metal sheets or copper wires) are used instead of the carbon brushes and a commutator made of a copper alloy. However, the commutator are worn away easily. Therefore, it is not used for such a rotary machine as an alternator for a vehicle.

SUMMARY OF THE INVENTION

Therefore, the present invention has an object of providing a compact and light-weighted generator which has brushes with the reduced spring load thereby restraining vibration of the brushes and elongating the life time of the brushes.

Another object of the present invention is to provide a generator which has self-lubricity and supply the rotor coil with the field current with sure even at a high speed range.

The alternator for a vehicle according to the invention comprises a slip ring unit having a pair of ring members made of a carbonaceous material and a brush unit having a pair of brushes made of a metal. Because the weight of the brushes is reduced, required spring load thereof is reduced. Therefore, wear of the ring members and brushes as well as vibration of the brushes can be reduced. Because the carbonaceous ring members provide a self-lubricity, a stable wear and reliable current supply to the field coil are ensured and the life time of the slip ring unit and brush unit is increased. That is, extra size and length for the wearing-down of the brushes are not necessary, so that brushes can be made thin, reducing the volume and weight of the generator.

Another object of the invention is to provide a generator which has brushes having hardness high enough to prevent the brush wear and to elongate the life time thereof. For this purpose, the brushes are made not by machining but by stamping. Each of the thin metal sheets is made of a spring material including at least one of phosphor bronze and beryllium bronze and abuts against the ring and an output terminal by the elasticity thereof.

A further object of the invention is to provide a generator which has elastic metal brushes functioning as conventional brush unit which is composed of a spring, pig tail and graphite brushes and as connecting members such as outer terminals and screws or rivets.

For this purpose, the brushes are made of a thin or laminated sheets of spring material such as copper alloy. Since the laminated sheets make the brushes thin, the brush unit can be drastically made light weighted and compact. Accordingly, the diameter and length of the generator can be reduced. The brushes abut against the rings at a sufficient contact pressure without extra springs so that stable current supply is ensured.

A further object of the invention is to provide a generator in which a contact pressure is not applied to a portion fixing the brush unit so that the electric power supply from the brushes to the slip ring unit can be made with sure.

For this purpose, each brush has an approximately semi-circular portion enclosing circumference of the ring, a supporting portion fixed to a stationary portion of the genrator and two contact members disposed at both edges of the semicircular portion to be in contact with the outer periphery of the ring member. Although one-side contact members may leave the outer periphery of the ring members when an excessive vibration is applied to the brushes, the other-side contact members stick to the outer periphery of the rings, so that the stable electric current supply is ensured.

A still further object of the invention is to provide a generator which is easy to be installed or discomposed. For this purpose, each of the brushes has axially extending members having chamfered shape, so that the two contact members can move smoothly in the axial direction.

A still further object of the invention is to provide a low cost generator which has cost reduced outer terminals. For this purpose, a brush holder supports an outer terminal of the brush unit, which fixes and connects electrically the brush supporting member of the brushes. The outer terminals may be made of a metal different from the brushes to reduce the cost.

A still further object of the invention is to provide a generator which prevents foreign particles including water and shavings. For this purpose, the brush holder has a cylindrical member to surround the rings and brushes.

A still further object of the invention is to provide a generator which has a slip ring unit composed of ring members made of a perforated metal having improved conductivity and strength. For this purpose, the ring member is composed of a perforated conductive-metal-structure as a host metal and carbon powder.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

An embodiment of the invention applied to a vehicular alternator is shown in FIGS. 1 to 4.

Figure 2:
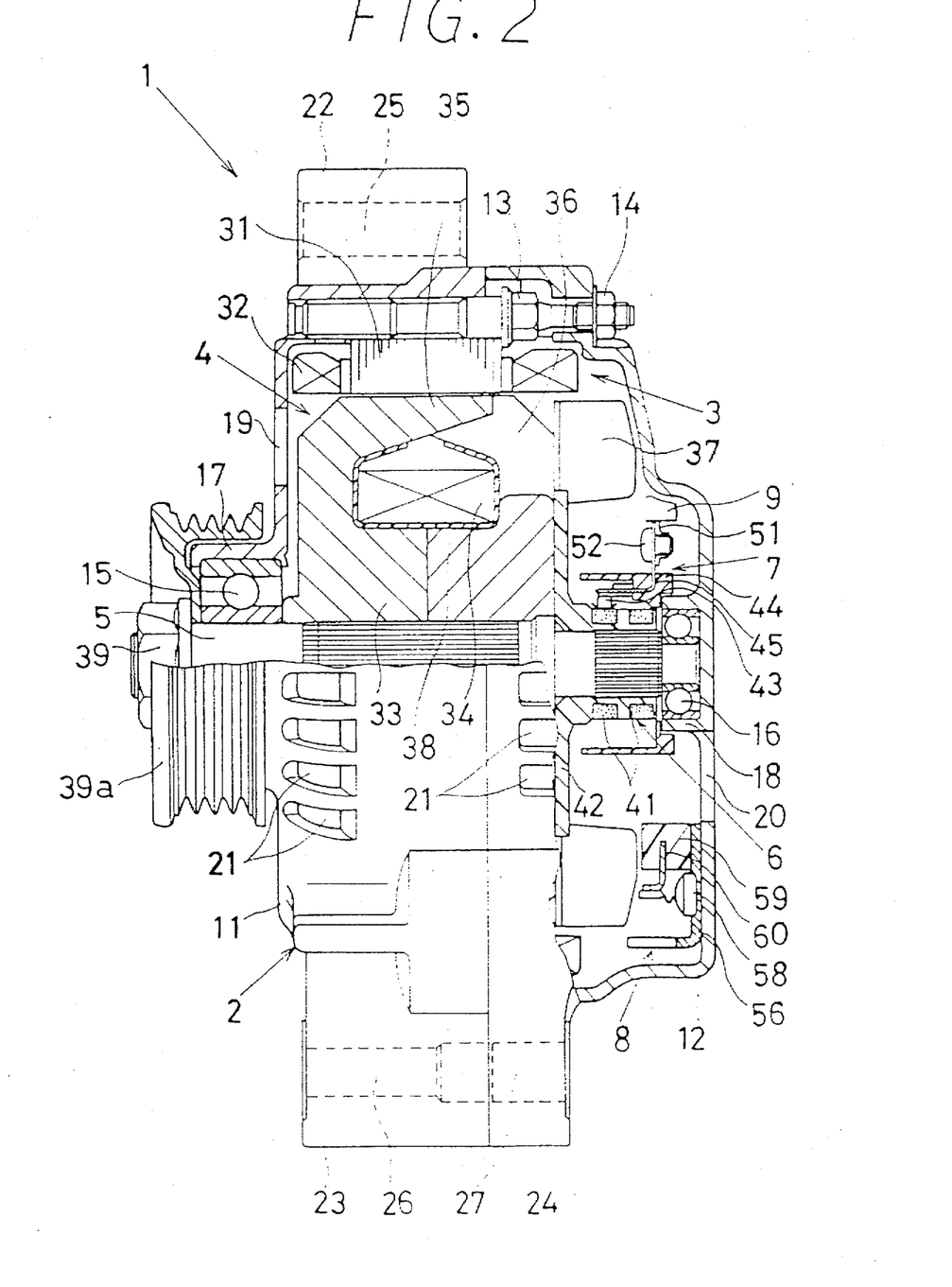
FIG. 2 is a cross-sectional view illustrating allover view of the alternator according to the embodiment of the present invention.

The alternator 1 is composed of a housing 2, a stator 3, a rotor 4, the slip ring unit 6, the brush unit 7, the three-phase rectifier 8 and the voltage regulator 9. The housing 2 is composed of two aluminum die-casts, that is a front housing 11 and a rear housing 12, and fastened by a plurality of stud bolts 13 and nuts 14. The front housing 11 has a front bearing 15 and the rear housing 12 has a rear bearing 16. They are press-fitted or caulked to carry the shaft 5 rotatably. A number of air-intake holes 19 are formed annularly in the front housings 11 to introduce cooling air therein and also a number of air-intake holes 20 and air-outlet holes 21 are formed annularly in the rear housing 12. A stay 22 is formed integrally with an upper portion of the front housing 11 to be fixed to an upper bracket (not shown) of an engine and a stay 23 is formed integrally with a lower portion thereof to be fixed to a lower bracket (not shown) of the engine. A stay 24 is formed integrally with a lower portion of the rear housing 12 to be fixed to the lower bracket of the engine. These stays 22–24 have through holes 25–27 for fastening bolts (not shown). The stator 3 is composed of a stator core 31 secured to the inner periphery of the housing 2 and three-phase stator coils 32 wound around the stator core 31.

The stator core 31 is made of laminated sheets of a magnetic material and press-fitted to the inner periphery of the front housing 11. The stator core 31 has numbers of slots (not shown) formed at even intervals in the inner periphery thereof. Three-phase stator coils 32 are connected into the Y-connection or the A-connection to generate three-phase AC output power as the rotor 4 rotates. The coil ends of the stator coils 32 are soldered and connected to the three-phase rectifier 8.

The rotor 4 is composed of the shaft 5, pole cores 33, a field coil 34 wound around the pole cores 33 and the slip ring unit 6 for supplying the field current to the field coil 34. The pole core 33 has claw poles 35 which become N-pole and other claw poles 36 which become S-pole when the field current is supplied to the field coil 34. A cooling fan (centrifugal fan) 37 is fixed to the rear surface of the claw poles 36 by welding or the like to take cooling air inside the housing 2. The field coil 34 has opposite ends connected to connection bars (not shown) by soldering. A coil bobbin 38 is made of an insulating resinous material and disposed to insulate the field coil 34 from the pole core 33.

The shaft 5 is rotatably carried by boss portions 17 and 18 of the housing 2 via the front and rear bearings 15 and 16. A V-ribbed pulley (pulley for a poly V-belt) 39a is fastened to an end of the shaft 5 between a washer-faced nut 39 and the front bearing 15 to transmit the engine rotational torque to the shaft 5. The V-ribbed pulley 39a is connected to a pulley for the poly V-belt carried by the engine output shaft (crank shaft) through a poly V-belt (not shown). A magnet clutch can be disposed between the shaft 5 and the V-ribbed pulley 39a.

Figure 1:
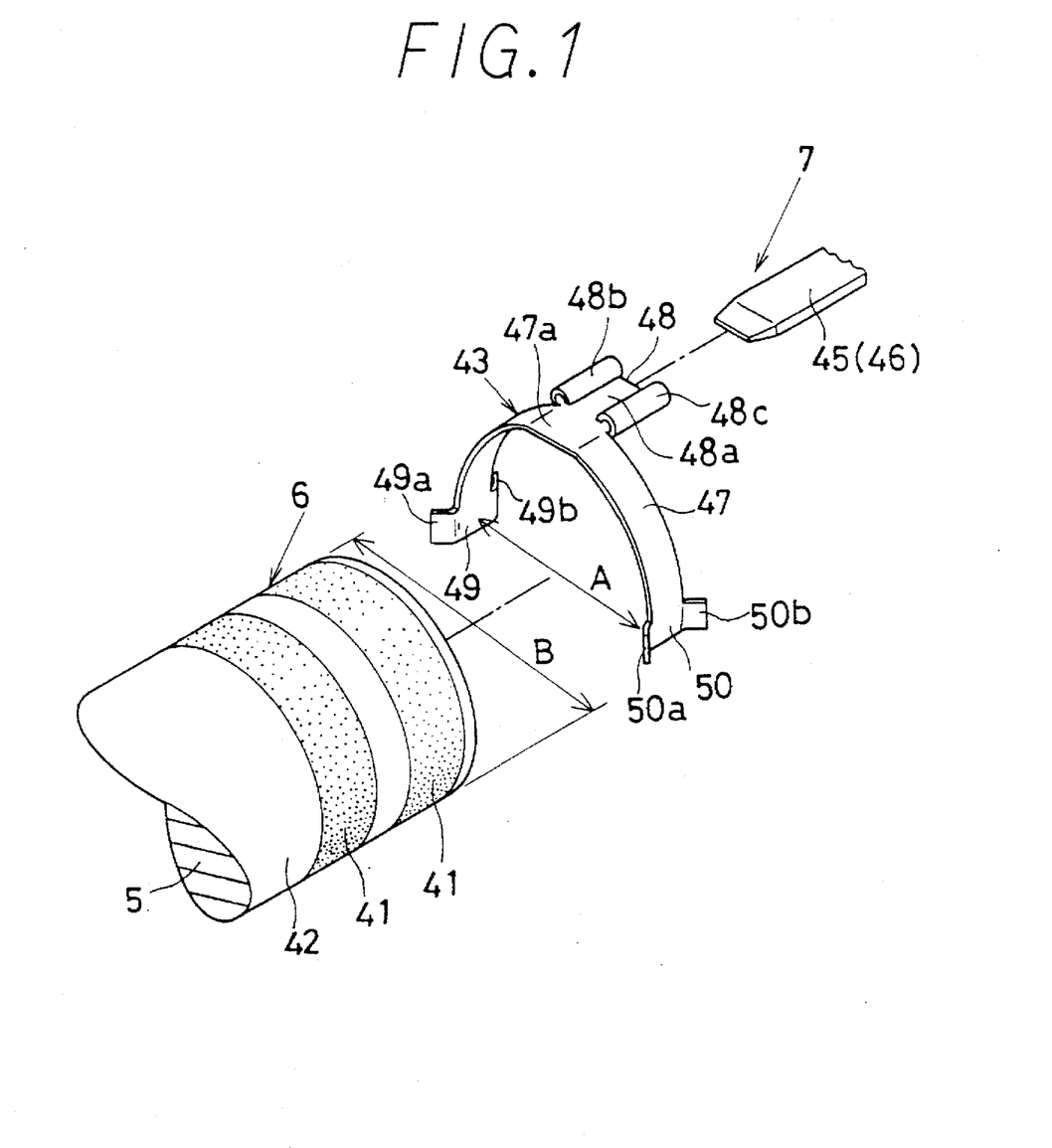
FIG. 1 is a cross-sectional view illustrating a slip ring unit and a brush unit of an alternator according to an embodiment of the present invention.

The slip ring unit 6 is a resinous mold composed of two carbonaceous rings 41, an insulating member 42 and two connection bars (not shown) connecting the rings to the field coil 34. Polyphenylene sulfide (PPS) is desirable for the insulating resinous material because of excellent insulation, heat resistance, high strength and high dimensional stability.

Each of the rings 41 is disposed on the outer periphery of the rear end of the shaft 5. Each of the rings 41 is composed of a structural ring member made of perforated copper alloy (as the host metal) and carbonaceous powder (such as carbon powder, natural graphite electric graphite or metal graphite)impregnated therein. The slip ring unit 6 is press-fitted to the outer periphery of the rear end of the shaft 5.

The brush 7 is composed of the two metal brushes 43 sliding on the outer periphery of the two carbonaceous rings 41, the brush holder 44 supporting and holding the metal brushes and the connecting terminals 45 and 46 inserted in the mold portion of the brush holder 44. The brushes 43 are made by stamping process. The metal brushes 43 are made of laminated sheets of springy copper alloy such as phosphor bronze or beryllium. Each of the brushes 43 has a brush body 47 surrounding one of the rings 41 and clamp portion 48 extending from the brush body 47 toward the brush holder 44. Two contact members 49 and 50 are formed on the edges of the brush body 47 to be in contact with the outer periphery of the carbonaceous rings 41. The brush body 47 has a semicircular member (horseshoe shape) and biased against one of the rings 41 by the shrink due to the difference (B−A) between the distance A between the contact members 49 and 50 and the diameter B of the rings 41.

The contact members 49 and 50 slide on the outer periphery of the one of the rings 41, which provides the contact pressure by its elasticity. Four projections 49a, 49b, 50a and 50b extend from opposite ends of the contact members 49 and 50 in the axial direction. The projections 49a and 49b, and projections 50a and 50b extend from the opposite ends of the rings 41 in the both axial directions and bent radially outward from the contact members 49 and 50 (chamfered).

The clamp portion 48 is electrically and mechanically fixed to the connecting terminals 45 and 46 in a manner to utilize the spring characteristic. For this purpose, the clamp portion 48 has the projection 48a axially extending from the base portion (top portion) 47a of the brush body 47 and clamp members 48b and 48c, each of which forms an elliptic cylinder having an elasticity. The clamp portion 48 holds each edge portion of the connecting terminals 45 and 46 by the projection 48a and the clamp members 48b and 48c.

The brush holder 44 holds two metal brushes 43 and is made of insulating resinous material (e.g. PPS). The brush holder 44 has the connecting terminals 45 and 46 molded integrally therewith, an annular portion to receive the rear end of the shaft 5 therein, and a cylindrical portion extending axially from the annular portion. The cylindrical portion helps take the air in the central portion of the fan evenly. Both ends of the connecting terminals 45 and 46 extend axially therefrom in opposite directions respectively. The brush holder 44 covers circumferences of the rings 41 and brushes 43 together with the insulating member 42.

Figure 3:
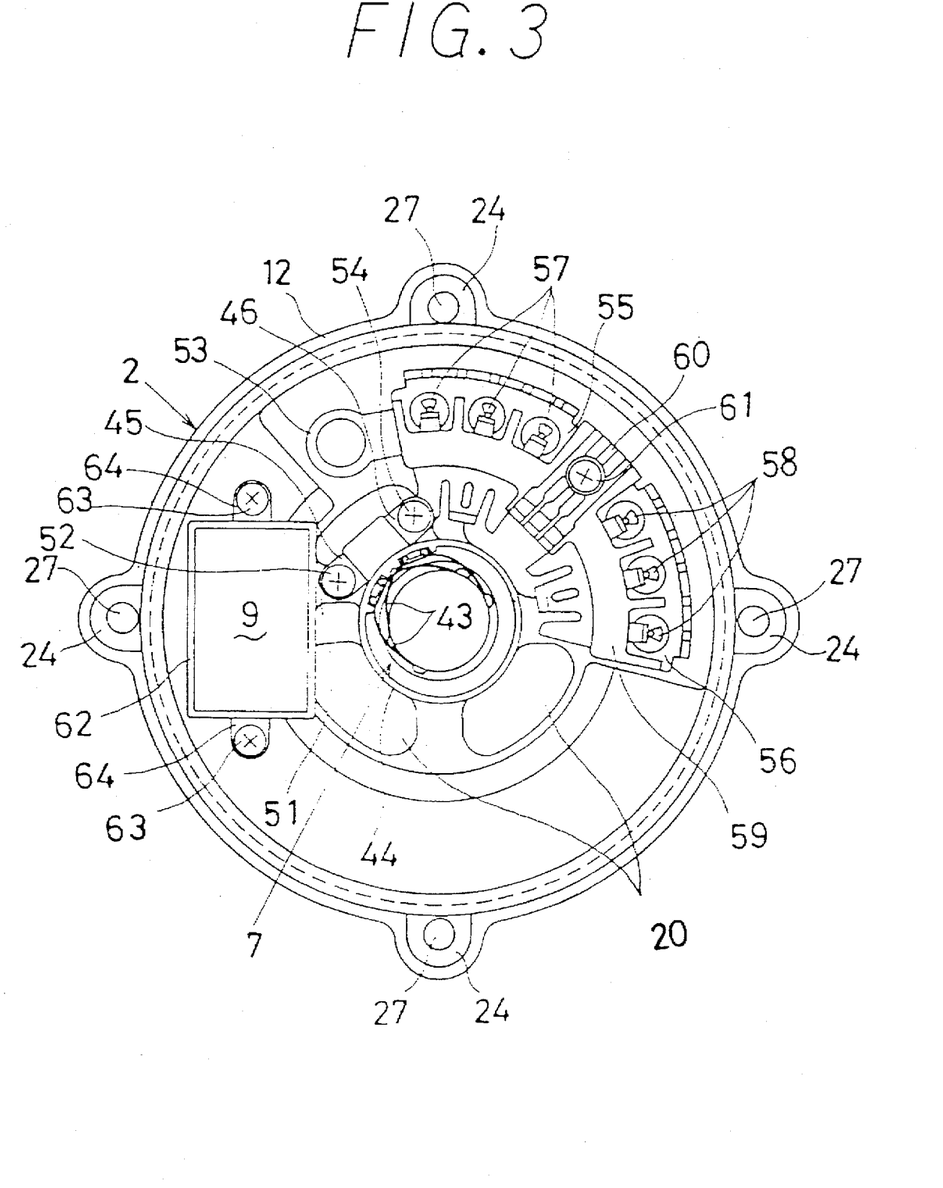
FIG. 3 is a cross-sectional plan view illustrating the rear portion of the alternator shown in FIG. 2.

The connecting terminal 45, which is an outer terminal of the brush unit 7, has a L-shaped cross-section. It is fastened by a fixing screw 52 to a field current terminal 51 to be electrically connected thereto. The connecting terminal 46, which is also an outer terminal of the brush unit 7, has an inverted L-shaped cross-section so as to extend in the direction opposite to the connecting terminal 45. It is fastened to a DC output terminal 53 of the three-phase rectifier 8 by a fixing screw 54 to be electrially connected thereto. The edge portions of the connecting terminal 45 and 46 are tapered so that they are inserted into a space between the projection 48a of the clamp portion 48 and clamp members 48b and 48c.

Figure 4:
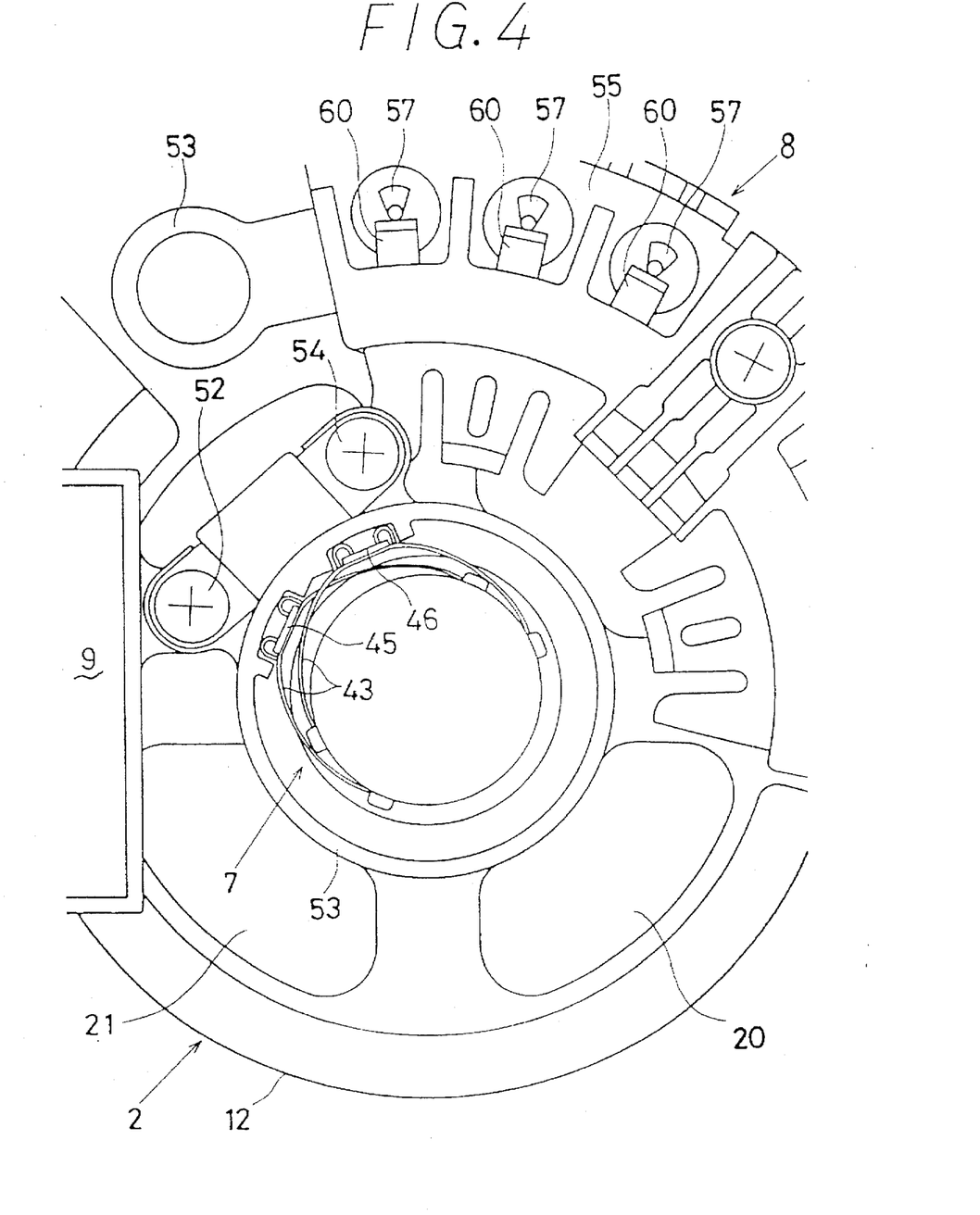
FIG. 4 is an enlarged view of a main portion shown in FIG. 3.

Thus, each ring 41 of the slip ring unit 6 is coupled with one of the metal brushes 43 of the brush unit 7 to form a power supply unit to the field coil 34 as shown in FIGS. 2 to 4.

As shown in FIG. 4, the rings 41 are shifted circumferentially from each other and fixed to the connecting terminals 45 and 46 in a cylindrical space.

The three-phase rectifier 8 is composed of the DC output terminal 53, plus-side cooling fin 55, minus-side cooling fin 56, three-plus-side diodes 57, three minus-side diodes 58 and a terminal support 59. The DC output terminal 53 has one end connected to the plus-terminal of a battery through an electric wire (not shown) and the other end fastened by fixing screws (not shown) to the connecting terminal 46 of the brush unit 7 and the plus-side cooling fin 55 to be electrically connected thereto. The plus-side cooling fin 55 is formed integrally with the minus-side cooling fin 56 so that they surround the brush holder 44 and is disposed along the side wall of the rear housing 12. The plus-side cooling fin 55 is fixed to the inner side wall of the rear housing 12 via an insulating member (not shown). The minus side cooling fin 56 is grounded through the rear housing 12. The plus-side and minus-side cooling fins 55 and 56 are made of conductive metal which is excellent in the heat conduction (such as aluminum), and are heat radiation fins for the three plus-side and the three minus-side diodes 57 and 58 as well as diode-holding members for holding the three plus-side and the three minus-side diodes 57 and 58 respectively. Each one end of the three plus-side diodes 57 and the three minus-side diodes 58 is soldered to one of three AC input terminals 60 for connection, and each the other end thereof is soldered to the plus-side and minus-side cooling fins 55 and 56 for connection. The three-phase rectifying circuit is composed of the DC output terminal 53, the plus-side and minus-side cooling fins 55 and 56, the plus-side and minus-side diodes 57 and 58 and the three AC input terminals 60. The terminal support 59, which is made of an insulating resinous material (e.g. PPS), has the three AC input terminals 60 molded integrally therewith and insulates the plus-side cooling fin 55 from the minus-side cooling fin 56. The terminal support 59 holds the plus-side cooling fin 55 and the minus side cooling fin 56 by a screw 61.

The voltage regulator 9 is composed of the field current terminal 51, an integrated circuit (not shown) and a casing 62 secured to the housing 12 by screws 63. The field current terminal 51 is an outer connecting terminal of the voltage regulator 9 which is held by the casing 62 secured to the rear housing 12 and mechanically connected the two metal brushes 43 by the fixing screw 52 via the connecting terminal 45. Therefore, the field current terminal 51 fixes the brush holder 44 and the two metal brushes 43 to the rear housing 12. The casing 62 is made of an insulating resinous material (e.g. PPS) and has a bracket 64 fixed to the rear housing 12.

If the alternator 1 is operated for a long time, the two carbonaceous rings 41 and two metal brushes, which are mechanically fixed to the connecting terminals 45 and 46 held by the brush holder 44, move relative to and in contact with each other and worn away. The carbonaceous rings 41 are self-lubricated and have a reduced coefficient of friction, and the two metal brushes 43 provide a reduced spring load, the wear rate thereof is very small as described later.

The resistivity of the vibration is generally expressed as follows according to a machine design book.

[Eq. 1]

$$\text{Resistivity of Vibration} = \{(k \times \text{spring load})/(\text{weight of brushes})\} + \{\text{weight of spring}\}$$

Therefore, if the weight of the brushes (brush body) is reduced, the spring load of the brushes can be reduced.

The metal brushes 43 according to the embodiment of the present invention have function of the spring and pigtail of the conventional brush unit with a reduced weight.

Because the brush body 47 of the metal brushes 43 have the semicircular portion encircling and holding the carbonaceous rings by the two contact members 49 and 50 from opposite outside directions, the composite vector of the contact pressures of the metal brushes 43 applied to the outer periphery of the carbonaceous rings 41 becomes zero so that no contact pressure is applied to the clamp portion 48.

If an excessive vibration is applied in a radial direction where one of the contact members 49 and 50 leaves the rings 41, the other contact member assures the electric connection of the brushes 43 and the rings 41, thereby supplying stable field current to the field coil 34.

The contact members 49 and 50 have chamfered-shape projections 49a, 49b, 50a and 50b so that the contact members 49 and 50 can move smoothly in the axial direction. Therefore, it is easy to install or remove the metal brushes 43 on or from the outer periphery of the carbonaceous rings 41. The metal brushes 43 is made by stamping a conductive laminated sheets and the hardness thereof affecting the ware rate can be increased sufficiently.

The brushes 43 may be made of a metal different from that of the connecting terminals 45 and 46 so that the production cost of the vehicular alternator 1 can be reduced. If the connecting terminals 45 and 46 are molded integrally with the brush holder 44, the connecting terminals 45 and 46 and the clamp portion 48 are mechanically connected after molding in order to prevent deterioration of wear resistivity of the metal brushes 43 due to temperature rise when the insert molding of the connecting terminals 45 and 46 is carried out.

The connecting terminals 45 and 46 and the clamp portion 48 can be connected by welding, caulking or the like.

Because the metal brushes 43 are resistant to wear, it is not necessary to have the extra size and length as the conventional carbon brushes made of material easy to be abraded. Therefore, even if the voltage regulator is disposed near the metal brushes, the diameter of the vehicular alternator 1 can be reduced and the length thereof can be also reduced.

Because the carbonaceous rings 41 have self-lubricity (to reduce the friction coefficient) and have much broader contacting surface than the conventional carbon brushes, that is, less chances of the contact per unit surface area than the conventional carbon brushes, the wear is reduced drastically as compared with the conventional metal rings 121. In addition, the spring load of the metal brushes is reduced because of the light weighted metal brushes 43, so that the life time of the carbonaceous rings can be elongated.

Figure 5:
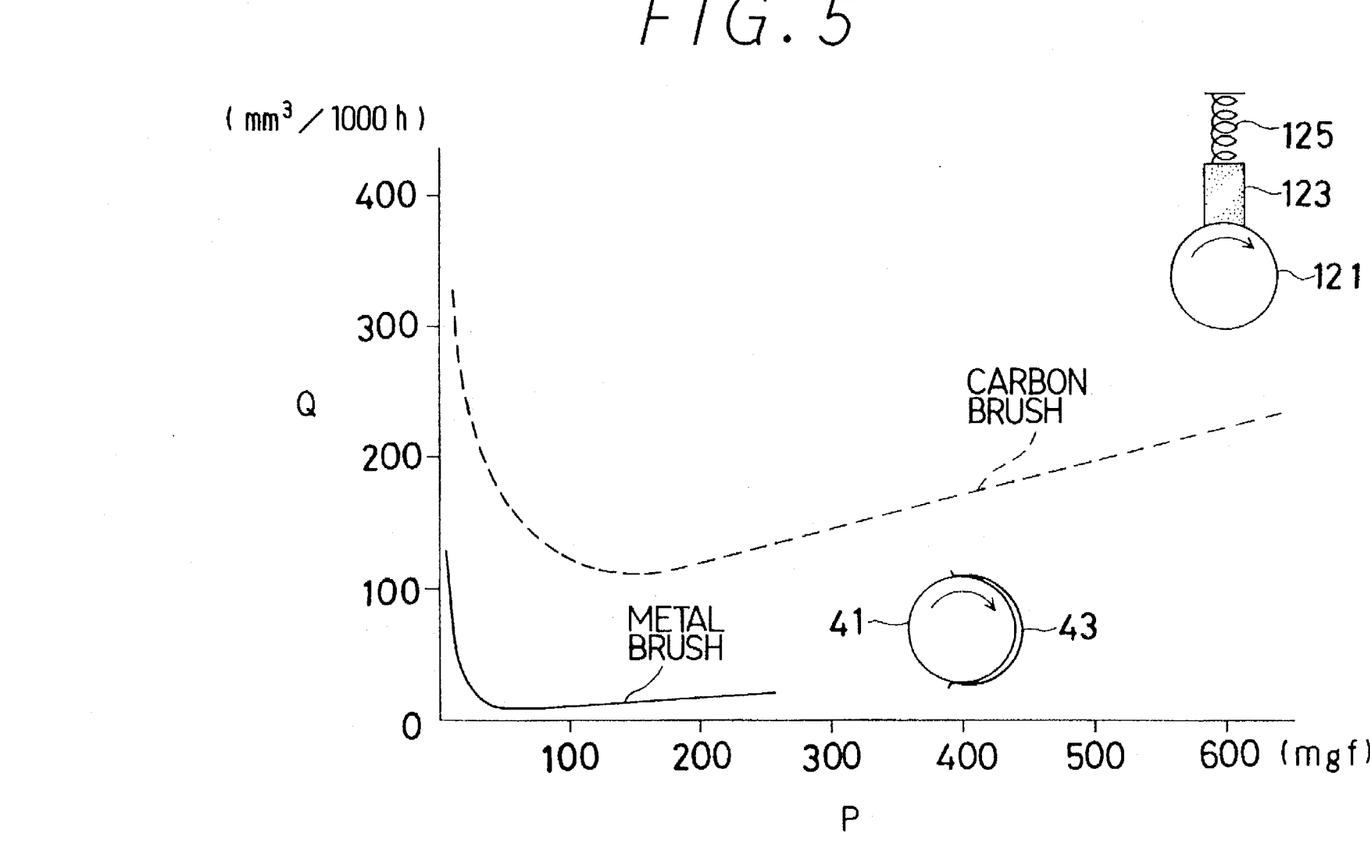
FIG. 5 is a graph is characteristic curves showing wear of a metal brush according to the embodiment of the present invention and a conventional carbon brush.

A test result is shown in FIG. 5, where comparison of wear quantity Q at various spring load P between the metal brushes in combination with the carbonaceous ring (according to the embodiment of the present invention) and conventional carbon brushes in combination with a conventional metal ring is made. As the spring load P becomes smaller than 80 gf, the wear quantity Q (mm$^3$/1000 hours) of the conventional carbonaceous brushes 123 increases, and as the spring load P increases from 170 gf, the ware quantity Q (mm$^3$/1000 hours) of the conventional carbonaceous brushes 123 increases.

Although, the wear quantity Q (mm$^3$/1000 hours) of the metal brushes 43 increases sharply as the spring load P becomes smaller than 30 gf, the quantity is less than ⅓ of the carbonaceous brushes 123. Although the wear quantity Q (mm$^3$/1000 hours) gradually increases as the spring load P becomes higher than 50 gf, it is negligibly small as compared to that of the carbon brushes 123. It is clear that the metal brushes 43 reduce the spring load and also the wear quantity drastically. The metal brushes 43, which are made of an elastic copper alloy functioning as the spring and pigtail of the conventional brush unit, can reduce number of parts.

Although the description of the above embodiment is made with reference to the vehicular alternator, the embodiment can be applied to a stationary AC generator for an electric power station of a building. It can be applied to a generator-motor also.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than restrictive, sense.

What we claim is:

1. A brush and slip ring arrangement of an AC generator which includes a housing, a stator having a stator coil, a rotor having a field coil and a shaft and a voltage regulator, wherein said arrangement comprises:
a slip ring unit carried by said shaft and having a cylindrical insulating member and a pair of carbonaceous slip rings around said cylindrical insulating member;
a pair of brush members made of springy copper alloy, each of said brush members having a semicircular brush body disposed to at least partially surround one of said slip rings, two contact portions disposed at opposite ends of said brush body in contact with one of said slip rings and a clamp portion; and
a brush holder fixed to said housing, said brush holder having a pair of connecting terminals each of which engages said clamp portion of one of said brush members and an insulating member insulating said connecting terminals from each other;
whereby portions of said slip rings in contact with said contact portions of said brush member always change so that said slip rings are cooled sufficiently.

2. A brush and slip ring arrangement as claimed in claim 1, wherein
said brush member comprises laminated elastic metal sheets.

3. A brush and slip ring arrangement as claimed in claim 2, wherein said elastic metal sheets are made of at least one of phosphor bronze and beryllium bronze.

4. A brush and slip ring arrangement as claimed in claim 1, wherein
each of said contact portions has an axially elongated chamfered member.

5. A brush and slip ring arrangement as claimed in claim 1, wherein
each of said slip rings is composed of a conductive perforated metal ring member and carbon powder impregnated in said metal ring member.

6. A brush and slip ring arrangement as claimed in claim 1, wherein
said insulating member of said brush holder comprises a cylindrical cover member for accommodating said brush members and said slip ring in a cylindrical space.

7. A brush and slip ring arrangement as claimed in claim 1, wherein
said clamp portion of each of said brush members extends axially toward said brush holder to elastically hold one of said connecting terminals of said brush holder.

8. A brush and slip ring arrangement as claimed in claim 6, wherein
said connecting terminals are spaced apart from each other circumferentially and axially.

9. A brush and slip ring arrangement as claimed in claim 6, said generator further including a cooling fan fixed to said rotor which has a plurality of circumferentially disposed blades, wherein
said cylindrical cover member of said brush holder is disposed in a space formed in said circumferentially disposed blades.

* * * * *